(12) United States Patent
Leadley et al.

(10) Patent No.: US 12,733,689 B2
(45) Date of Patent: Sep. 15, 2026

(54) AEROSOL PROVISION SYSTEM

(71) Applicant: Nicoventures Trading Limited, London (GB)

(72) Inventors: David Leadley, London (GB); Colin Dickens, London (GB); Robert Kersey, London (GB); Darryl Baker, London (GB)

(73) Assignee: Nicoventures Trading Limited, London (GB)

( * ) Notice: Subject to any disclaimer, the term of this patent is extended or adjusted under 35 U.S.C. 154(b) by 339 days.

(21) Appl. No.: 18/555,063

(22) PCT Filed: Apr. 12, 2022

(86) PCT No.: PCT/GB2022/050915
§ 371 (c)(1),
(2) Date: Oct. 12, 2023

(87) PCT Pub. No.: WO2022/219322
PCT Pub. Date: Oct. 20, 2022

(65) Prior Publication Data

US 2024/0188643 A1 Jun. 13, 2024

(30) Foreign Application Priority Data

Apr. 12, 2021 (GB) ...................................... 2105177

(51) Int. Cl.
*A24F 40/65* (2020.01)
*A24F 40/51* (2020.01)
(Continued)

(52) U.S. Cl.
CPC .............. *A24F 40/65* (2020.01); *A24F 40/51* (2020.01); *A24F 40/60* (2020.01); *H04W 4/80* (2018.02)

(58) Field of Classification Search
CPC .......... A24F 40/51; A24F 40/60; A24F 40/65; H04W 4/80
See application file for complete search history.

(56) References Cited

U.S. PATENT DOCUMENTS 11,582,648 B2 * 2/2023 Dotto .................. H04W 72/543
2020/0375256 A1 12/2020 Chong et al.

FOREIGN PATENT DOCUMENTS

CN 110868874 A 3/2020
EP 3750425 A1 12/2020
(Continued)

OTHER PUBLICATIONS

"International Search Report and Written Opinion received for PCT Patent Application No. PCT/GB2022/050915, mailed on Jun. 30, 2022", 12 pages.
(Continued)

*Primary Examiner* — Tuan H Nguyen
(74) *Attorney, Agent, or Firm* — Burr & Forman

(57) ABSTRACT

There is provided a method of pairing a non-combustible aerosol provision system with a user device. The method can include detecting, by the non-combustible aerosol provision system, a predetermined input at the non-combustible aerosol provision system, and entering, in response to detecting the predetermined input, a pairing mode at the non-combustible provision system in which the non-combustible aerosol provision system is responsive to pairing requests. The method further can include receiving a pairing request from the user device, and then pairing, in response to the pairing request, the non-combustible aerosol provision system with the user device.

20 Claims, 2 Drawing Sheets

(51) Int. Cl.
*A24F 40/60* (2020.01)
*H04W 4/80* (2018.01)

(56) References Cited

FOREIGN PATENT DOCUMENTS

| | | | |
|---|---|---|---|
| JP | 2002073565 | A | 3/2002 |
| WO | 2016123307 | A1 | 8/2016 |
| WO | 2017055801 | A1 | 4/2017 |
| WO | 2018125889 | A1 | 7/2018 |
| WO | 2019215213 | A1 | 11/2019 |
| WO | 2020176898 | A1 | 9/2020 |
| WO | 2020264196 | A1 | 12/2020 |

OTHER PUBLICATIONS

First Office Action from corresponding Chinese Application No. 202280041790.0, mailed Apr. 14, 2026, all pages cited in its entirety.

* cited by examiner

AEROSOL PROVISION SYSTEM

PRIORITY CLAIM

The present application is a National Phase entry of PCT Application No. PCT/GB2022/050915, filed Apr. 12, 2022, which claims priority from GB Application No. 2105177.6, filed Apr. 12, 2021, each of which hereby fully incorporated herein by reference.

TECHNICAL FIELD

The present disclosure relates to the field of aerosol provision systems. In particular, but not exclusively, the present disclosure relates to pairing an aerosol provision system with a user device.

BACKGROUND

A "non-combustible" aerosol provision system is an aerosol provision system where a constituent aerosol-generating material of the aerosol provision system (or component thereof) is not combusted or burned in order to facilitate delivery of at least one substance to a user.

The non-combustible aerosol provision system may be an electronic cigarette, also known as a vaping device or electronic nicotine delivery system (END), although it is noted that the presence of nicotine in the aerosol-generating material is not a requirement.

The non-combustible aerosol provision system may be an aerosol-generating material heating system, also known as a heat-not-burn system. An example of such a system is a tobacco heating system.

The non-combustible aerosol provision system may be a hybrid system to generate aerosol using a combination of aerosol-generating materials, one or a plurality of which may be heated. Each of the aerosol-generating materials may be, for example, in the form of a solid, liquid or gel and may or may not contain nicotine. The hybrid system may comprise a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable for use with the non-combustible aerosol provision device.

The non-combustible aerosol provision system, such as a non-combustible aerosol provision device thereof, may comprise a power source and a controller. The power source may, for example, be an electric power source or an exothermic power source. The exothermic power source comprises a carbon substrate which may be energized so as to distribute power in the form of heat to an aerosol-generating material or to a heat transfer material in proximity to the exothermic power source.

The non-combustible aerosol provision system may comprise an area for receiving the consumable, an aerosol generator, an aerosol generation area, a housing, a mouthpiece, a filter and/or an aerosol-modifying agent.

The consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

Known approaches are described in WO2016/123307A1, WO2017/055801A1, WO2020/363483A1, WO2019/215213A1 and WO2018/125889A1.

SUMMARY

Viewed from a first aspect, there is provided a method of pairing a non-combustible aerosol provision system with a user device, the method comprising: detecting, by the non-combustible aerosol provision system, a predetermined input at the non-combustible aerosol provision system; entering, in response to detecting the predetermined input, a pairing mode at the non-combustible provision system in which the non-combustible aerosol provision system is responsive to pairing requests; receiving a pairing request from the user device; and pairing, in response to the pairing request, the non-combustible aerosol provision system with the user device. Thus there can be provided a reliable and effective approach for causing a non-combustible aerosol provision system to enter a pairing mode only when required by the user.

Viewed from a second aspect, there is provided a non-combustible aerosol provision system comprising: an input element configured to detect a predetermined input at the non-combustible aerosol provision system; wherein in response to detecting the predetermined input, the non-combustible aerosol provision system is configured to enter a pairing mode in which the non-combustible aerosol provision system is responsive to pairing requests; and a receiver element configured to receive a pairing request from the user device; wherein in response to the pairing request, the non-combustible aerosol provision system is configured to pair with the user device. Thus there can be provided an efficient and reliable approach for controlling when a non-combustible aerosol provision system can create new connection parings.

Viewed from a third aspect, there is provided a computer-readable medium comprising instruction which, when executed by processing circuitry of a non-combustible aerosol provision system, cause the non-combustible aerosol provision system to become configured to: detect a predetermined input at the non-combustible aerosol provision system; enter, in response to detecting the predetermined input, a pairing mode at the non-combustible provision system in which the non-combustible aerosol provision system is responsive to pairing requests; receive a pairing request from the user device; and pair, in response to the pairing request, the non-combustible aerosol provision system with the user device.

BRIEF DESCRIPTION OF FIGURES

Embodiments and examples of the present approaches will now be described, by way of example only, with reference to the accompanying drawings, in which.

Figure 1:
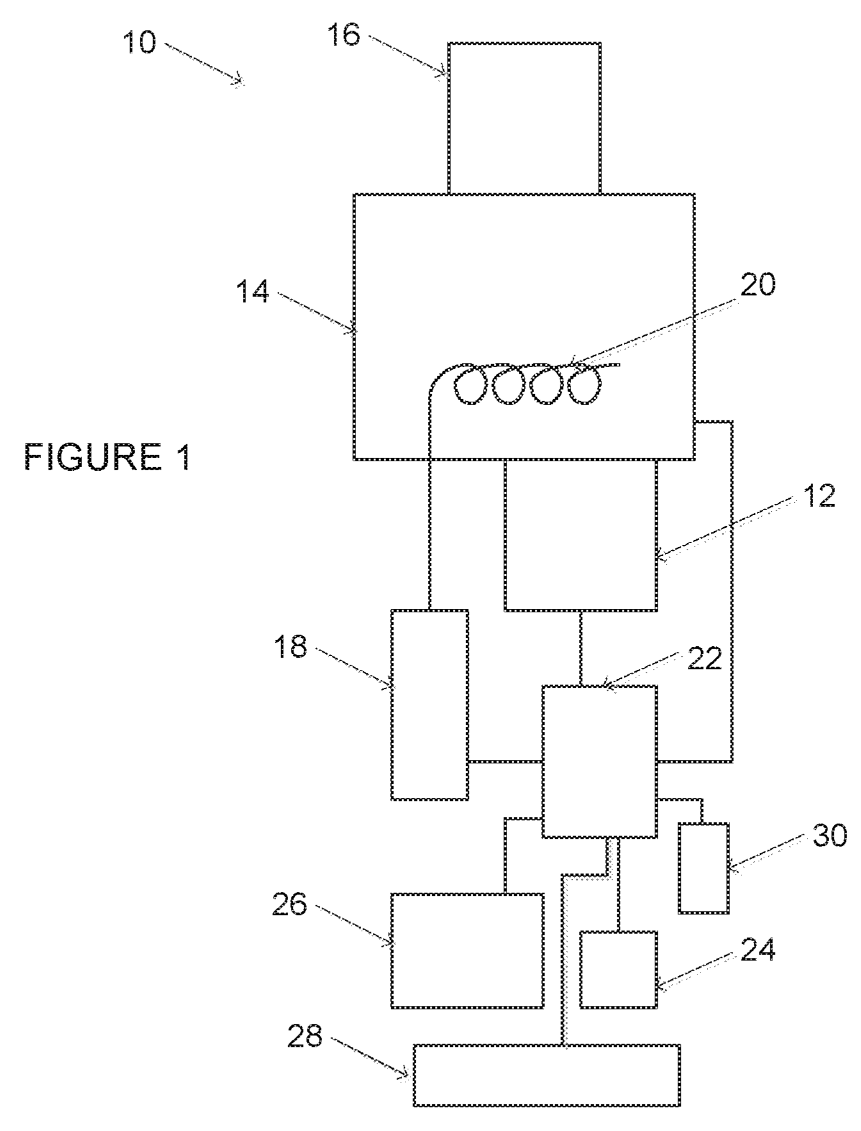
FIG. 1 is a schematic illustrating an example of a non-combustible aerosol provision system.

While the presently described approach is susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope as defined by the appended claims.

DETAILED DESCRIPTION

Communication between a non-combustible aerosol provision system and a user device may provide a convenient way for a user to manage the non-combustible aerosol provision system. For example, in many cases the user device will have a more accessible interface, greater processing power, and more connectivity options than the non-combustible aerosol provision system itself. However, by leveraging all of those features of the user device, a high degree of control and connectivity may nonetheless be achieved with the non-combustible aerosol provision system.

For example, by enabling communication between the non-combustible aerosol provision system and the user device, the user device may be used to control settings on the non-combustible aerosol provision system, view status information for the non-combustible aerosol provision system, etc.

The techniques described herein provide a convenient and secure approach for pairing a non-combustible aerosol provision system with a user device to facilitate such communication. As described herein, the non-combustible aerosol provision system can be placed into a pairing mode to accept connection requests from devices. By facilitating this pairing mode, the non-combustible aerosol provision system can be set to reject new connection requests when not in the pairing mode, thereby restricting the connection only to a device of the user's choosing.

This may be important for example in situations where there are many non-combustible aerosol provision systems and/or user devices in close proximity such that many combinations of connection between the systems and user devices would be possible. By pairing the devices in this way, and controlling the entry into the pairing mode as described herein, the user can conveniently and securely pair the desired user device with the appropriate non-combustible aerosol provision system whilst reducing the likelihood of inadvertently pairing with an unintended user device/non-combustible aerosol provision system.

It will be appreciated that the present approaches involve transmission of data to and from a non-combustible aerosol provision system, and for the non-combustible aerosol provision system to process stored and/or received data. Also, the present approaches require a user device to be capable of communicating with a non-combustible aerosol provision system. Such a user device may be capable of communicating with other services or systems. Therefore, to illustrate suitable devices for providing such functionalities, an example non-combustible aerosol provision system 10 and an example user device 40 are illustrated with respect to FIGS. 1 and 2 respectively.

An example of a non-combustible aerosol provision system 10 is schematically illustrated in FIG. 1. As shown, the aerosol delivery device 10 is a device which contains elements relating to aerosol generation such as an aerosol medium container or cartridge 12 (in the case of an END device, the aerosol medium container or cartridge 12 will contain nicotine or a nicotine-bearing formulation), an aerosol generation chamber 14 and an outlet 16 through which a generated aerosol may be discharged. A battery 18 may be provided to power a thermal generator element (such as a heater coil 20) within (or functionally adjacent to) the aerosol generation chamber 14. The battery 18 may also power a processor/controller 22 which may serve purposes of device usage, such as activation of the device for aerosol generation in response to an activation trigger, and purposes of communication and functionality control. Processor/controller 22 may have access to a memory 24 which may be used to store operating instructions for the processor/controller 22. The memory 24 may also be used to store data describing operating conditions and/or states of the non-combustible aerosol provision system 10 and/or one or more components thereof. The memory 24 may be internal to the processor/controller 22 or may be provided as an additional separate physical element.

To perform transmission and reception of data and/or messaging, the processor/controller 22 is provided with a transmitter/receiver element 26. The transmitter/receiver element 26 enables the non-combustible aerosol provision system 10 to communicate with a connected device using a connectivity technology such as a personal area network protocol. Example personal area network protocols include Bluetooth™, Bluetooth Low Energy™ (BLE), Zigbee™, Wireless USB, and Near-Field Communication (NFC). Example personal area network protocols also include protocols making use of optical communication such as Infrared Data association (IrDA), and data-over-sound. Other wireless technologies such as a Wi-Fi™ technology may be used if the non-combustible aerosol provision system has suitable capability. In other examples, the transmitter/receiver element 26 may be configured to provide for a wired communication channel provided between physical ports of the non-combustible aerosol provision system 10 and a connected device. Such a wired communication channel may utilize a physical connection technology such as USB™, a serial port, FireWire™ or other point-to-point wired connectivity. The remainder of this discussion will use the example of BLE and will use BLE terminology, although it will be appreciated that corresponding or equivalent functionalities of other personal area network technologies may be substituted. Thus, in the present example, the transmitter/receiver element 26 is a BLE interface element including or connected to a radio antenna for wireless communication. In other examples such as those indicated above this may be an interface element for an alternative wireless technology and/or a wired connection interface.

Any communication established with a connected device may be impermanent or otherwise transient in the sense that the channel may be established for a period of time necessary to carry out specific functionalities, but may also be disconnected when not required. For this reason such a connected device will be referred to herein as a user device, in the sense that the device is likely to be utilized and/or controlled by a user of the non-combustible aerosol provision system 10 and a connected device. An example of such a user device (which may also be termed a remote device, in the sense that the device is remote from the non-combustible aerosol provision system, or intermediary device, in the sense that the device is intermediate between the non-combustible aerosol provision system and the unlock/age verification services) is described below with reference to FIG. 2.

Returning to the discussion of FIG. 1, the processor/controller 22 may in one example be an STM32 microcontroller as provided by ST Microelectronics and based on the ARM™ Cortex™-M processor. In other examples an alternative microcontroller or processor may be used, which may be based upon an ARM™ architecture, and Atom™ architecture or other low power processor technology. Alternatively or additionally, the transmitter/receiver element 26 may in one example include an nRF BLE chip for cooperating with the processor/controller to provide BLE connectivity to the non-combustible aerosol provision system. In other examples, other communication interface chips or modules may be deployed to provide connectivity services.

As illustrated, processor/controller 22 may be connected for example to aerosol medium container or cartridge 12, aerosol generation chamber 14 and battery 18. This connection may be to an interface connection or output from ones of the components and/or may be to a sensor located at or in ones of the components. These connections may provide access by the processor to properties of the respective components. For example a battery connection may be used to control activation of the non-combustible aerosol provision system for aerosol generation.

Further functionalities of the processor/controller 22 and/or the memory 24 will be described with reference to the examples of the present approaches below.

The non-combustible aerosol provision system 10 may includes an input element 28. In some examples, this input element 28 includes a button or other element capable of receiving a physical input from a user. Further, in some examples the input element comprises an accelerometer capable of detecting motion of the non-combustible aerosol provision system 10. More specifically, the accelerometer may be capable of detecting acceleration of the non-combustible aerosol provision system 10 caused for example by tapping on or shaking the non-combustible aerosol provision system. The non-combustible aerosol provision system 10 may also comprise an output element 30 (which may include one or more of a display, an audio output, and a haptic output). Where the output element is a display, the input element may be a touch-sensitive and/or pressure-sensitive detector included in the display, such as a touch-screen display. In some examples, the input element 28 may also or alternatively include an audio detector capable of receiving an audio input. Such an audio input may then be subjected to recognition processing (such as speech recognition processing) by the processor/controller 22 (or other processing hardware of the non-combustible aerosol provision system) in order to receive an audio input from a user.

Figure 2:
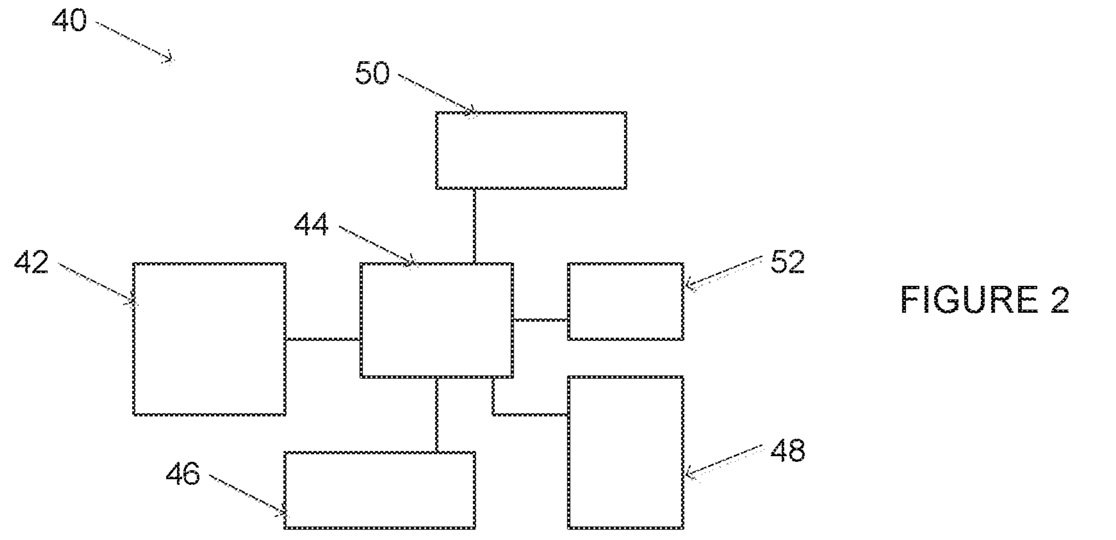
FIG. 2 is a schematic illustrating an example of a user device.

An example of a user device 40 is schematically illustrated in FIG. 2. The user device may be a device such as a mobile telephone (cellphone) or tablet of a user (and/or owner) of the non-combustible aerosol provision system 10. As shown, the user device 40 includes a receiver transmitter element 42 for communicating with a non-combustible aerosol provision system 10. Thus the receiver transmitter element 42 will be configured to use the same connectivity and protocols, etc., as the non-combustible aerosol provision system 10 with which it is to interact in any given implementation. Accordingly, in the present examples, the receiver transmitter element 42 is a BLE interface element including or connected to a radio antenna for wireless communication. In other examples such as those indicated above this may be an interface element for an alternative wireless technology and/or a wired connection interface.

The receiver transmitter element 42 is connected to a processor or controller 44 which can receive and process the data or messaging received from the non-combustible aerosol provision system. The processor or controller 44 has access to a memory 46 which can be used to store program information and/or data. The user device 40 may include a further data transmission interface 48. This interface may provide one or more interface functionalities, for example to a wired connection such as wired local area network and/or to a wireless connection such as wireless local area network and/or cellular data services. This interface may be used for example for sending and receipt of messaging to and from various other devices, computer systems, and/or computer services as required by any particular implementation. This interface may also or alternatively be used for communications relating to other functionalities of the user device 40 which are unrelated to operation of or interaction with a non-combustible aerosol provision system.

The user device 40 also includes user interface elements including an output device 50 (which may include one or more of a display, an audio output, and a haptic output) and an input device 52 (which may include one or more of buttons, keys, touch-sensitive display elements, or a mouse/trackpad).

The user device 40 may be pre-programmed or configured to provide the functionalities according to the approaches discussed below. Additionally or alternatively, the user device may store software (e.g. in memory 46) such as an app to cause the processor or controller 44 to have those functionalities when the software is executed. Thus the user device may be a multi-purpose device that has the described functionalities when the app is executed.

Software to cause the user device to become programmed for the techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media such as carrier signals and transmission media. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media. Transient communication media may occur between components of a single computing system (e.g. on an internal link or bus between e.g. a memory and processor) or between separate computing systems (e.g. over a network or other inter-computing device connection), and may include transmission signals, carrier waves or the like.

Such software may be loaded directly to the user device 40 from a computer-readable medium, or may be loaded to the user device by connecting the user device to another computing device (such as a desktop computer, laptop computer or the like) and using software on the other computing device to control the loading of software to the user device.

Thus there have been described a non-combustible aerosol provision system and a user device that may interact to provide a number of additional functionalities for the non-combustible aerosol provision system to a user of the user device. Examples of such functionalities will now be described.

Figure 3:
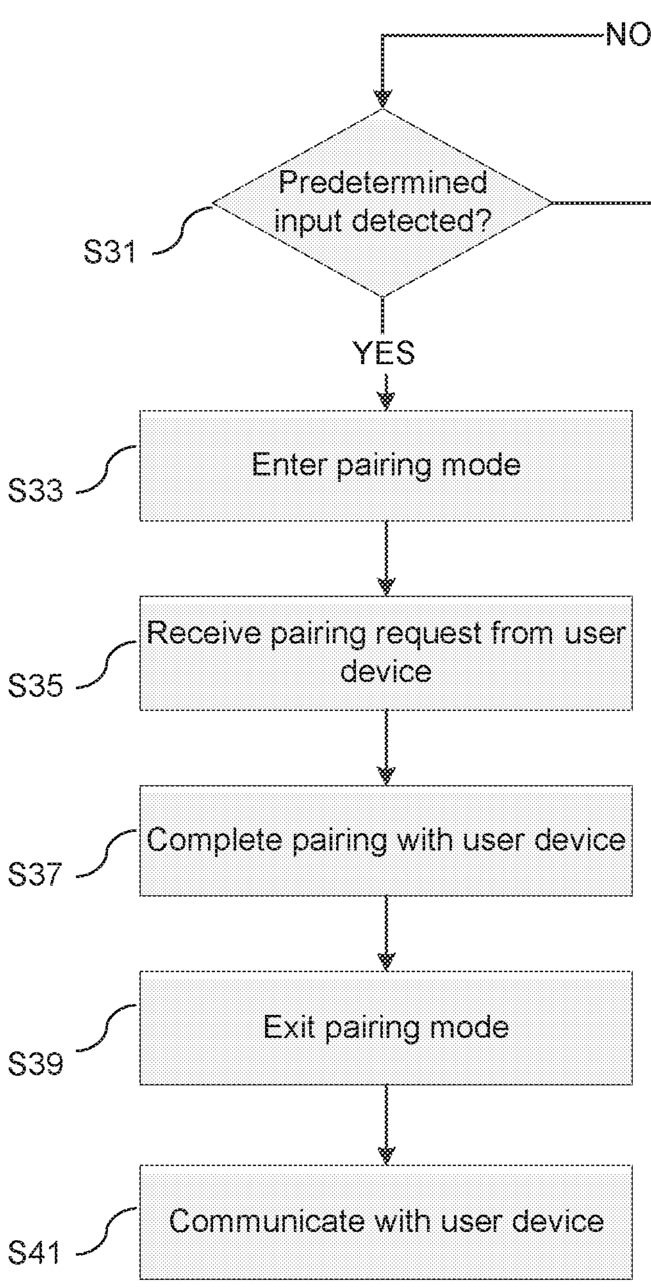
FIG. 3 is a flowchart illustrating a method of pairing a non-combustible aerosol provision system with a user device.

FIG. 3 is a flowchart illustrating a method of pairing a non-combustible aerosol provision system 10 with a user device 40.

As used herein pairing refers to the establishment of a connection between the non-combustible aerosol provision system 10 and the user device 40. In some examples, the non-combustible aerosol provision system 10 and the user device 40 are configured to communicate using Bluetooth™/BLE and pairing is Bluetooth™ pairing. However, it will be appreciated that the present techniques are not limited to Bluetooth™ pairing and may be used with a range of different connectivity technology. For example, the present techniques could be used with personal area network protocols such as Zigbee™, Wireless USB, NFC, IrDA or Wi-Fi™ technologies. The remainder of this discussion will use the example of BLE and will use BLE terminology, although it will be appreciated that corresponding or equivalent functionalities of other personal area network technologies may be substituted.

As shown in S31 of FIG. 3, the non-combustible aerosol provision system 10 detects a predetermined input which is treated as a trigger to enter pairing mode at the non-combustible aerosol provision system 10. The predetermined input may be an input set by the manufacturer or in some cases may be chosen by the user from a plurality of supported input actions. The non-combustible aerosol provision system 10 detects the input with input element 28, the form of which corresponds to the form of the predetermined input.

In some examples, the predetermined input is a button press and detecting the predetermined input comprises detecting a button being pressed on the non-combustible aerosol provision system 10. In this case, the input element 28 comprises the button. In some examples, the input element 28 comprises an accelerometer. In these examples, the predetermined input may comprise one or more taps or shakes of the non-combustible aerosol provision system 10. This provides a simple and convenient way to signal to the non-combustible aerosol provision system 10 by the user that the device 10 is to enter pairing mode.

To reduce the chance of accidentally triggering the non-combustible aerosol provision system 10 to enter the pairing mode by the user inadvertently performing the predetermined input (e.g., by shaking the device 10 as he/she walks or pressing a button as the device 10 is picked up), the predetermined input may comprise a series of input steps. For example, the non-combustible aerosol provision system 10 may be configured to detect as the predetermined input, a predetermined number of taps or shakes of the non-combustible aerosol provision system 10 within a predetermined time period or with each tap or shake in the sequence occurring within a certain time of the previous one. Specific examples, include shaking the device fives times in five seconds, tapping the device five times in succession with no more than ½ second between taps, and tapping the device twice in two seconds). In some examples, the predetermined input comprises a combination of more than one type of input. For example, to enter the pairing mode, the user may press a button on the non-combustible aerosol provision system 10 and then say a predetermined utterance, (e.g., "enter pairing mode"). In this examples, the input element 28 comprises the button and an audio detector (e.g., microphone) capable of receiving the audio input.

Irrespective of the form of the predetermined input, in response to detection of the predetermined input, the non-combustible aerosol provision system 10 is configured to enter a pairing mode in which the non-combustible aerosol provision system 10 is responsive to pairing requests as shown in S33.

While not in the pairing mode, the non-combustible aerosol provision system 10 may be configured to ignore or reject unsolicited connection requests with devices that have not already been paired with the non-combustible aerosol provision system 10. In this way, the non-combustible aerosol provision system 10 may maintain a whitelist of authorized devices for which the pairing process has been performed. Any device not on the whitelist seeking to connect to the non-combustible aerosol provision system 10 while the system 10 is not the pairing mode may be prevented from connecting. However, when in the pairing mode, the non-combustible aerosol provision system 10 may be configured to accept such unsolicited connection requests.

Entering the pairing mode by the non-combustible aerosol provision system 10 may also comprise sending an advertising packet that can be received by nearby devices. The advertising packet may indicate that the device is in pairing mode and/or that the device is discoverable and permitted to be displayed to users of those devices. While in the pairing mode, the non-combustible aerosol provision system 10 may also be responsive to queries from other devices to provide an indication of the state of the non-combustible aerosol provision system 10, i.e., that the system 10 is in the pairing mode. In this way, the non-combustible aerosol provision system 10 is able to inform other devices that the system 10 is in the pairing mode and/or invite such devices to issue a connection request.

It will be appreciated that the form of the advertising packet and/or the indication that the system 10 is in the pairing mode may be selected in accordance with the communication technology being used. For example, where the device and the non-combustible aerosol provision system 10 communicate using BLE, the non-combustible aerosol provision system 10 may be configured to issue a BLE advertising packet.

A user device 40 receiving the advertising packet or otherwise becoming aware that the non-combustible aerosol provision system 10 is in the pairing mode may provide an indication to the user that the non-combustible aerosol provision system 10 is available for pairing. In response to the user selecting the non-combustible aerosol provision system 10, the user device may then issue a connection request to the non-combustible aerosol provision system 10 which is received by the non-combustible aerosol provision system 10 at S35.

The pairing request may take any suitable form, but in the present examples receiving the pairing request from the user device 40 comprises receiving a connection request packet that was issued responsive to receipt of the advertising packet.

At this point, the non-combustible aerosol provision system 10 may proceed to pair with the user device 40 at S37. However, in some examples, the non-combustible aerosol provision system 10 performs an authentication process to verify the pairing request. The authentication process could take a number of possible forms, however, in some examples, the authentication process involves entering a PIN at one or more of the non-combustible aerosol provision system 10 and the user device 40, or otherwise providing an input at the non-combustible aerosol provision system 10 and/or the user device 40. For example, the user device 40 may indicate to the user that he/she should tap the non-combustible aerosol provision system 10 as confirmation that the non-combustible aerosol provision system 10 is to be paired with the user device 40. This authentication process therefore provides further confirmation that the combination of user device 40 and non-combustible aerosol provision system 10 are to be paired, thereby reducing the likelihood that a non-combustible aerosol provision system 10 could inadvertently be paired with a device for which pairing was not intended.

Once the authentication has been successfully completed (if being performed), the non-combustible aerosol provision system 10 is paired with the user device 40 at S37. This may involve adding the user device 40 to the whitelist of devices maintained by the non-combustible aerosol provision system. This may therefore allow the non-combustible aerosol provision system 10 and the user device 40 to subsequently communicate with each other even when neither device is in the pairing mode. As such, these user device 40 and non-combustible aerosol provision system 10 may be termed "paired".

With the pairing complete, the non-combustible aerosol provision system 10 exits the pairing mode at S39.

Although, exiting the pairing mode is depicted in FIG. 3 as occurring after the pairing process, in some examples, exiting the pairing mode is performed before or substantially simultaneous to pairing with the user device 40. By exiting the pairing mode, the non-combustible aerosol provision system 10 may prevent further unsolicited connection requests from devices and again limit connections to only those devices that have been paired with the non-combustible aerosol provision system 10. This therefore provides additional security since the non-combustible aerosol provision system 10 is able to restrict connection to only those devices that the user has paired with the system 10. In the example mentioned above in which being in the pairing mode involves sending advertising packets, exiting the pairing mode would involve ceasing sending of advertising packets.

With the non-combustible aerosol provision system 10 and the user device 40 paired as described herein, the system 10 and device 40 may communicate with each other at S41. The content of such communication may be dictated by how the non-combustible aerosol provision system 10 and user device 40 are used, but the communication may for example be used to provide usage information from the non-combustible aerosol provision system 10 to the user device 40 for display/analysis and/or be used to control settings (e.g., heater power settings) on the non-combustible aerosol provision system 10 from the user device 40.

Hence, there has been described a secure and convenient way of pairing a non-combustible aerosol provision system 10 and a user device 40 to facilitate communication between the system 10 and device 40. As mentioned the specific input required at the non-combustible aerosol provision system can take many forms and use a variety of different kinds of input elements provided at the non-combustible aerosol provision system. All of these approaches have in common that the pairing mode activation can be limited to a very specific input pattern such as to limit the opportunities for accidental activation of pairing mode leading to pairings with undesired other devices (such as malicious devices or devices operated by malicious persons). In the example of the input device being an accelerometer this additionally provides that no moving parts are needed by the non-combustible aerosol provision system in order to enable the pairing operation.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of the claims. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A method of pairing a non-combustible aerosol provision system with a user device, the method comprising:

detecting, by the non-combustible aerosol provision system, a predetermined input at the non-combustible aerosol provision system;

entering, in response to detecting the predetermined input, a pairing mode at the non-combustible provision system in which the non-combustible aerosol provision system is responsive to pairing requests;

receiving a pairing request from the user device; and pairing, in response to the pairing request, the non-combustible aerosol provision system with the user device, wherein the method further comprises performing an authentication process to verify the pairing request prior to the pairing, the authentication process comprising detecting a further input at the non-combustible aerosol provision system and/or the user device.

2. The method according to claim 1, wherein:

the predetermined input comprises one or more taps or shakes of the non-combustible aerosol provision system; and detecting the predetermined input comprises detecting with an accelerometer of the non-combustible aerosol provision system, the one or more taps or shakes.

3. The method according to claim 2, wherein:

the predetermined input comprises a predetermined number of taps or shakes of the non-combustible aerosol provision system within a predetermined time period.

4. The method according to claim 1, wherein:

the predetermined input comprises a button press; and detecting the predetermined input comprises detecting a button being pressed on the non-combustible aerosol provision system.

5. The method according to claim 1, the method further comprising:

exiting the pairing mode at the non-combustible aerosol provision system; and communicating, by the non-combustible aerosol provision system, with the user device.

6. The method according to claim 1, wherein:

the pairing is a Bluetooth protocol pairing.

7. The method according to claim 1, wherein:

entering the pairing mode at the non-combustible aerosol provision system comprises sending an advertising packet; and receiving the pairing request from the user device comprises receiving a connection request packet that was issued responsive to receipt of the advertising packet.

8. A non-combustible aerosol provision system comprising:

an input element configured to detect a predetermined input at the non-combustible aerosol provision system, wherein in response to detecting the predetermined input, the noncombustible aerosol provision system is configured to enter a pairing mode in which the non-combustible aerosol provision system is responsive to pairing requests; and a receiver element configured to receive a pairing request from a user device, wherein in response to the pairing request, the non-combustible aerosol provision system is configured to pair with the user device, and wherein the non-combustible aerosol provision system is further configured to perform an authentication process to verify the pairing request prior to pairing with the user device, the authentication process comprising detecting a further input at the non-combustible aerosol provision system and/or the user device.

9. The non-combustible aerosol provision system according to claim 8, wherein:

the predetermined input comprises:

one or more taps or shakes of the non-combustible aerosol provision system, or a predetermined number of taps or shakes of the non-combustible aerosol provision system within a predetermined time period; and the input element comprises an accelerometer configured to detect the one or more taps or shakes or the predetermined number of taps or shakes.

10. The non-combustible aerosol provision system according to claim 8, wherein:

the input element comprises a button; and the predetermined input comprises a button press of the button.

11. The non-combustible aerosol provision system according to claim 8, wherein:

the non-combustible aerosol provision system is configured to exit the pairing mode and communicate with the user device.

12. The non-combustible aerosol provision system according to claim 8, wherein:

the pairing is a Bluetooth protocol pairing.

13. The non-combustible aerosol provision system according to claim 8, wherein:

to enter the pairing mode, the non-combustible aerosol provision system is configured to send an advertising packet; and to receive the pairing request from the user device, the non-combustible aerosol provision system is configured to receive a connection request packet that was issued responsive to receipt of the advertising packet.

14. A non-transitory computer-readable storage medium comprising instructions which, when executed by processing circuitry of a non-combustible aerosol provision system, cause the non-combustible aerosol provision system to become configured to:

detect a predetermined input at the non-combustible aerosol provision system;

enter, in response to detecting the predetermined input, a pairing mode at the non-combustible provision system in which the non-combustible aerosol provision system is responsive to pairing requests;

receive a pairing request from a user device; and pair, in response to the pairing request, the non-combustible aerosol provision system with the user device, and perform an authentication process to verify the pairing request prior to pairing the non-combustible aerosol provision system with the user device, the authentication process comprising detecting a further input at the non-combustible aerosol provision system and/or the user device.

15. A non-transitory computer-readable storage medium according to claim 14, wherein:

the predetermined input comprises one or more taps or shakes of the non-combustible aerosol provision system; and the instructions cause the non-combustible aerosol provision system to detect the predetermined input by detecting with an accelerometer of the non-combustible aerosol provision system, the one or more taps or shakes.

16. A non-transitory computer-readable storage medium according to claim 15, wherein:

the predetermined input comprises a predetermined number of taps or shakes of the non-combustible aerosol provision system within a predetermined time period.

17. A non-transitory computer-readable storage medium according to claim 14, wherein:

the predetermined input comprises a button press; and the instructions cause the non-combustible aerosol provision system to detect the predetermined input by detecting a button being pressed on the non-combustible aerosol provision system.

18. A non-transitory computer-readable storage medium according to claim 14, wherein the instructions cause the non-combustible aerosol provision system to become configured to:

exit the pairing mode; and communicate with the user device.

19. A non-transitory computer-readable storage medium according to claim 14, wherein:

the pairing is a Bluetooth protocol pairing.

20. The non-transitory computer-readable storage medium according to claim 14, wherein the instructions cause the non-combustible aerosol provision system to become configured to:

enter the pairing mode by sending an advertising packet; and receive the pairing request from the user device by receiving a connection request packet that was issued responsive to receipt of the advertising packet.

* * * * *